United States Patent
Merrick

(10) Patent No.: US 9,022,483 B2
(45) Date of Patent: May 5, 2015

(54) SEATBELT BUCKLE TONGUE ASSEMBLY

(75) Inventor: David D. Merrick, Rochester, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 268 days.

(21) Appl. No.: 13/490,892

(22) Filed: Jun. 7, 2012

(65) Prior Publication Data

US 2013/0328378 A1    Dec. 12, 2013

(51) Int. Cl.
 B60R 22/00    (2006.01)
 A44B 11/25    (2006.01)
 B60R 22/26    (2006.01)
 B60R 22/18    (2006.01)

(52) U.S. Cl.
 CPC ................. *B60R 22/26* (2013.01); *B60R 22/18* (2013.01)

(58) Field of Classification Search
 CPC ....... B60R 22/26; B60R 22/18; A44B 11/125
 USPC ......................................... 297/468; 24/68 SB
 See application file for complete search history.

(56) References Cited

U.S. PATENT DOCUMENTS

| | | | |
|---|---|---|---|
| 805,674 | A | 11/1905 | Senderling |
| 820,383 | A | 5/1906 | Ashland |
| 867,162 | A | 9/1907 | Seidl |
| 906,045 | A | 12/1908 | Miller |
| 940,917 | A | 11/1909 | Asquith |
| 1,079,080 | A | 11/1913 | Ward |
| 1,171,380 | A | 2/1916 | Arthur |
| 1,299,821 | A | 4/1919 | Carpmill et al. |
| 1,397,237 | A | 11/1921 | Schenk |
| 1,369,456 | A | 2/1922 | Meredith |
| 1,438,898 | A | 12/1922 | Carpmill |
| 1,816,262 | A | 7/1931 | Ritter |
| 1,930,378 | A | 10/1933 | Beagan |
| 2,124,276 | A | 7/1938 | Steigenberger |
| 2,132,556 | A | 10/1938 | Blackshaw |
| 2,372,557 | A | 3/1945 | Dowd |

(Continued)

FOREIGN PATENT DOCUMENTS

| | | |
|---|---|---|
| CA | 2038505 | 9/1991 |
| CA | 2091526 | 10/1993 |

(Continued)

OTHER PUBLICATIONS

Britax, "COMPAQ: Convertible Car Seats." Buckle Image. Accessed Oct. 12, 2010. (2 pages). This has been publicly available for at least one year prior to this application's filing date.

(Continued)

*Primary Examiner* — Milton Nelson, Jr.
(74) *Attorney, Agent, or Firm* — Perkins Coie LLP

(57) ABSTRACT

Self adjusting and/or locking buckle tongue assemblies for use with occupant restraint systems in vehicles are described herein. In one embodiment, a buckle tongue assembly includes a plate having a tongue portion configured to cooperatively engage a corresponding buckle assembly. The buckle tongue assembly of this embodiment can further include first and second web gripping portions carried by the plate. The second web gripping portion is configured to move relative to the first web gripping portion between a first position in which the web gripping portions are spaced apart to permit movement of a web therebetween, and a second position in which the web gripping portions are engaged or interlocked to clamp the web therebetween.

30 Claims, 4 Drawing Sheets

(56) References Cited

U.S. PATENT DOCUMENTS

| | | |
|---|---|---|
| 2,393,551 A | 1/1946 | Morin |
| 2,398,947 A | 4/1946 | Marinsky |
| 2,437,585 A | 3/1948 | Zimmern |
| 2,482,693 A | 9/1949 | Rogers et al. |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,710,999 A | 6/1955 | Davis |
| 2,763,451 A | 9/1956 | Moran |
| 2,803,864 A | 8/1957 | Bishaf |
| 2,845,233 A | 7/1958 | Wrighton |
| 2,846,745 A | 8/1958 | Lathrop |
| 2,856,663 A | 10/1958 | Elsner |
| 2,869,200 A | 1/1959 | Phillips et al. |
| 2,876,516 A | 3/1959 | Cummings |
| 2,892,232 A | 6/1959 | Quilter |
| 2,893,088 A | 7/1959 | Harper et al. |
| 2,899,732 A | 8/1959 | Cushman |
| 2,901,794 A | 9/1959 | Prete, Jr. |
| 2,938,254 A | 5/1960 | Gaylord |
| 2,964,815 A | 12/1960 | Sereno |
| 2,965,942 A | 12/1960 | Carter |
| 3,013,517 A | 12/1961 | Isham |
| 3,029,487 A | 4/1962 | Asai |
| 3,084,411 A | 4/1963 | Lindblad |
| 3,091,010 A | 5/1963 | Davis |
| 3,104,440 A | 9/1963 | Davis |
| 3,110,071 A | 11/1963 | Higuchi |
| 3,118,208 A | 1/1964 | Wexler |
| 3,128,520 A | 4/1964 | Carter et al. |
| 3,137,907 A | 6/1964 | Unai |
| D198,566 S | 7/1964 | Holmberg et al. |
| 3,142,103 A | 7/1964 | Lindblad |
| 3,145,442 A | 8/1964 | Brown |
| 3,165,805 A | 1/1965 | Lower |
| 3,178,226 A | 4/1965 | Lorwin |
| 3,179,992 A | 4/1965 | Murphy, Sr. |
| 3,183,568 A | 5/1965 | Gaylord |
| 3,189,963 A | 6/1965 | Warner et al. |
| 3,218,685 A | 11/1965 | Atumi |
| 3,226,791 A | 1/1966 | Carter |
| 3,233,941 A | 2/1966 | Selzer |
| 3,256,576 A | 6/1966 | Klove, Jr. et al. |
| 3,262,169 A | 7/1966 | Jantzen |
| 3,287,062 A | 11/1966 | Board |
| 3,289,261 A | 12/1966 | Davis |
| 3,293,713 A | 12/1966 | Gaylord |
| 3,306,662 A | 2/1967 | Finnigan |
| 3,312,502 A | 4/1967 | Coe |
| 3,369,842 A | 2/1968 | Adams et al. |
| 3,380,776 A | 4/1968 | Dillender |
| 3,414,947 A | 12/1968 | Holmberg et al. |
| 3,428,029 A | 2/1969 | Klickstein |
| 3,451,720 A | 6/1969 | Makinen |
| 3,491,414 A | 1/1970 | Stoffel |
| 3,505,711 A | 4/1970 | Carter |
| 3,523,342 A | 8/1970 | Spires |
| D218,589 S | 9/1970 | Lohr |
| 3,540,091 A | 11/1970 | Marosy |
| 3,564,672 A | 2/1971 | McIntyre |
| 3,576,056 A | 4/1971 | Barcus |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,658,281 A | 4/1972 | Gaylord |
| 3,673,645 A | 7/1972 | Burleigh et al. |
| 3,675,499 A | 7/1972 | Marosy |
| 3,678,542 A | 7/1972 | Prete, Jr. |
| 3,695,696 A | 10/1972 | Lohr et al. |
| 3,714,684 A | 2/1973 | Gley |
| 3,744,102 A | 7/1973 | Gaylord |
| 3,744,103 A | 7/1973 | Gaylord |
| 3,760,464 A | 9/1973 | Higuchi |
| 3,766,611 A | 10/1973 | Gaylord |
| 3,766,612 A | 10/1973 | Hattori |
| 3,775,813 A | 12/1973 | Higuchi |
| 3,825,979 A | 7/1974 | Jakob |
| 3,827,716 A | 8/1974 | Vaughn et al. |
| 3,856,351 A | 12/1974 | Garvey |
| 3,879,810 A | 4/1975 | Prete, Jr. et al. |
| 3,898,715 A | 8/1975 | Balder |
| 3,935,618 A | 2/1976 | Fohl et al. |
| 3,964,138 A | 6/1976 | Gaylord |
| 3,975,800 A * | 8/1976 | Farlind ............................ 24/196 |
| 3,986,234 A | 10/1976 | Frost et al. |
| 3,995,885 A | 12/1976 | Plesniarski |
| 4,018,399 A | 4/1977 | Rex |
| 4,026,245 A | 5/1977 | Arthur |
| 4,027,361 A | 6/1977 | Yoneya |
| 4,051,743 A | 10/1977 | Gaylord |
| 4,095,313 A | 6/1978 | Piljay et al. |
| D248,618 S | 7/1978 | Anthony |
| 4,100,657 A | 7/1978 | Minolla et al. |
| 4,118,833 A | 10/1978 | Knox et al. |
| 4,128,924 A | 12/1978 | Happel et al. |
| 4,136,422 A | 1/1979 | Ivanov et al. |
| 4,148,224 A | 4/1979 | Craig |
| 4,181,832 A | 1/1980 | Ueda |
| 4,184,234 A | 1/1980 | Anthony et al. |
| 4,185,363 A | 1/1980 | David |
| 4,196,500 A | 4/1980 | Happel et al. |
| 4,220,294 A | 9/1980 | DiPaola |
| 4,228,567 A | 10/1980 | Ikesue et al. |
| 4,239,260 A | 12/1980 | Hollowell |
| 4,253,623 A | 3/1981 | Steger et al. |
| 4,262,396 A | 4/1981 | Koike et al. |
| 4,273,301 A | 6/1981 | Frankila |
| 4,302,049 A | 11/1981 | Simpson |
| 4,317,263 A | 3/1982 | Fohl et al. |
| 4,321,734 A | 3/1982 | Gandelman |
| 4,334,341 A | 6/1982 | Krautz et al. |
| 4,336,636 A | 6/1982 | Ishiguro et al. |
| 4,366,604 A | 1/1983 | Anthony et al. |
| 4,385,425 A | 5/1983 | Tanaka et al. |
| 4,408,374 A | 10/1983 | Fohl et al. |
| 4,419,874 A | 12/1983 | Brentini et al. |
| 4,425,688 A | 1/1984 | Anthony et al. |
| 4,457,052 A | 7/1984 | Hauber |
| 4,487,454 A | 12/1984 | Biller |
| 4,487,588 A | 12/1984 | Lewis, III et al. |
| 4,491,343 A | 1/1985 | Fohl et al. |
| 4,525,901 A | 7/1985 | Krauss |
| 4,542,563 A | 9/1985 | Befort |
| 4,545,097 A | 10/1985 | Wier et al. |
| 4,549,769 A | 10/1985 | Pilarski |
| 4,555,831 A | 12/1985 | Otzen et al. |
| 4,569,535 A | 2/1986 | Haglund et al. |
| 4,606,577 A | 8/1986 | Hirama et al. |
| D285,383 S | 9/1986 | Anthony |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hakansson et al. |
| 4,644,618 A | 2/1987 | Holmberg et al. |
| 4,646,400 A | 3/1987 | Tanaka et al. |
| 4,648,483 A | 3/1987 | Skyba |
| 4,650,214 A | 3/1987 | Higbee |
| 4,651,946 A | 3/1987 | Anthony et al. |
| 4,656,700 A | 4/1987 | Tanaka et al. |
| 4,660,889 A | 4/1987 | Anthony et al. |
| 4,679,852 A | 7/1987 | Anthony et al. |
| 4,682,791 A | 7/1987 | Ernst et al. |
| 4,685,176 A | 8/1987 | Burnside et al. |
| 4,685,177 A | 8/1987 | Escaravage |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,721,338 A | 1/1988 | Kondo |

(56) References Cited

U.S. PATENT DOCUMENTS

| | | |
|---|---|---|
| 4,726,625 A | 2/1988 | Bougher |
| 4,727,628 A | 3/1988 | Rudholm et al. |
| 4,733,444 A | 3/1988 | Takada |
| 4,738,485 A | 4/1988 | Rumpf |
| 4,741,574 A | 5/1988 | Weightman et al. |
| 4,742,604 A | 5/1988 | Mazelsky |
| D296,678 S | 7/1988 | Lortz et al. |
| 4,757,579 A | 7/1988 | Nishino et al. |
| 4,758,048 A | 7/1988 | Shuman |
| 4,766,654 A | 8/1988 | Sugimoto |
| 4,786,078 A | 11/1988 | Schreier et al. |
| 4,786,080 A | 11/1988 | Jay |
| 4,790,597 A | 12/1988 | Bauer et al. |
| 4,809,409 A | 3/1989 | Van Riesen et al. |
| 4,832,410 A | 5/1989 | Bougher |
| 4,843,688 A | 7/1989 | Ikeda et al. |
| 4,854,607 A | 8/1989 | Mandracchia et al. |
| 4,854,608 A | 8/1989 | Barral et al. |
| D303,232 S | 9/1989 | Lortz et al. |
| 4,876,770 A | 10/1989 | Bougher |
| 4,876,772 A | 10/1989 | Anthony et al. |
| 4,884,652 A | 12/1989 | Vollmer |
| 4,901,407 A | 2/1990 | Pandola et al. |
| 4,903,377 A | 2/1990 | Doty |
| 4,911,377 A | 3/1990 | Lortz et al. |
| 4,919,484 A | 4/1990 | Bougher et al. |
| 4,925,221 A | 5/1990 | Carmody et al. |
| 4,927,211 A | 5/1990 | Bolcerek |
| 4,934,030 A | 6/1990 | Spinosa et al. |
| 4,940,254 A | 7/1990 | Ueno et al. |
| 4,942,649 A | 7/1990 | Anthony et al. |
| 4,995,640 A | 2/1991 | Saito et al. |
| 5,005,266 A | 4/1991 | Fister et al. |
| 5,005,267 A | 4/1991 | Sugimoto |
| 5,015,010 A | 5/1991 | Homeier et al. |
| 5,023,981 A | 6/1991 | Anthony et al. |
| 5,026,093 A | 6/1991 | Nishikaji |
| 5,029,369 A | 7/1991 | Oberhardt et al. |
| 5,031,962 A | 7/1991 | Lee |
| 5,038,446 A | 8/1991 | Anthony et al. |
| 5,039,169 A | 8/1991 | Bougher et al. |
| 5,046,687 A | 9/1991 | Herndon |
| 5,050,274 A | 9/1991 | Staniszewski et al. |
| 5,054,815 A | 10/1991 | Gavagan |
| 5,058,244 A | 10/1991 | Fernandez |
| 5,067,212 A | 11/1991 | Ellis |
| 5,074,011 A | 12/1991 | Carlson |
| 5,074,588 A | 12/1991 | Huspen |
| 5,084,946 A | 2/1992 | Lee |
| 5,088,160 A | 2/1992 | Warrick |
| 5,088,163 A | 2/1992 | van Riesen et al. |
| 5,097,572 A | 3/1992 | Warrick |
| 5,100,176 A * | 3/1992 | Ball et al. .................. 280/801.1 |
| D327,455 S | 6/1992 | Blair |
| 5,119,532 A | 6/1992 | Tanaka et al. |
| 5,123,147 A | 6/1992 | Blair |
| 5,123,673 A | 6/1992 | Tame |
| 5,142,748 A | 9/1992 | Anthony et al. |
| 5,159,732 A | 11/1992 | Burke et al. |
| 5,160,186 A | 11/1992 | Lee |
| 5,165,149 A | 11/1992 | Hihei |
| 5,170,539 A | 12/1992 | Lundstedt et al. |
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| 5,234,181 A | 8/1993 | Schroth et al. |
| 5,236,220 A | 8/1993 | Mills |
| 5,248,187 A | 9/1993 | Harrison |
| D342,465 S | 12/1993 | Anthony et al. |
| 5,267,377 A | 12/1993 | Gillis et al. |
| 5,269,051 A | 12/1993 | McFalls |
| 5,272,770 A | 12/1993 | Allen et al. |
| 5,282,672 A | 2/1994 | Borlinghaus |
| 5,282,706 A | 2/1994 | Anthony et al. |
| 5,283,933 A | 2/1994 | Wiseman et al. |
| 5,286,057 A | 2/1994 | Forster |
| 5,286,090 A | 2/1994 | Templin et al. |
| 5,292,181 A | 3/1994 | Dybro |
| 5,301,371 A | 4/1994 | Chao |
| 5,308,148 A | 5/1994 | Peterson et al. |
| 5,311,653 A | 5/1994 | Merrick |
| 5,332,968 A | 7/1994 | Brown |
| 5,350,195 A | 9/1994 | Brown |
| 5,350,196 A | 9/1994 | Atkins |
| 5,369,855 A | 12/1994 | Tokugawa et al. |
| 5,370,333 A | 12/1994 | Lortz et al. |
| 5,375,879 A | 12/1994 | Williams et al. |
| 5,377,386 A | 1/1995 | Griffith |
| 5,380,066 A | 1/1995 | Wiseman et al. |
| 5,392,535 A | 2/1995 | Van Noy et al. |
| 5,397,171 A | 3/1995 | Leach |
| 5,403,038 A | 4/1995 | McFalls |
| 5,406,681 A | 4/1995 | Olson et al. |
| 5,411,292 A | 5/1995 | Collins et al. |
| 5,416,957 A | 5/1995 | Renzi, Sr. et al. |
| D359,710 S | 6/1995 | Chinni et al. |
| 5,430,914 A | 7/1995 | Patterson et al. |
| 5,432,987 A | 7/1995 | Schroth |
| 5,435,272 A | 7/1995 | Epstein |
| 5,443,302 A | 8/1995 | Dybro |
| 5,451,094 A | 9/1995 | Templin et al. |
| D364,124 S | 11/1995 | Lortz et al. |
| 5,466,044 A | 11/1995 | Barley et al. |
| 5,471,714 A | 12/1995 | Olson et al. |
| 5,487,588 A | 1/1996 | Burleigh et al. |
| 5,495,646 A | 3/1996 | Scrutchfield et al. |
| 5,497,956 A | 3/1996 | Crook |
| 5,511,856 A | 4/1996 | Merrick et al. |
| 5,516,199 A | 5/1996 | Crook et al. |
| 5,524,965 A | 6/1996 | Barley |
| 5,526,556 A | 6/1996 | Czank |
| 5,540,403 A | 7/1996 | Standley |
| 5,560,565 A | 10/1996 | Merrick et al. |
| 5,561,891 A | 10/1996 | Hsieh |
| 5,566,431 A | 10/1996 | Haglund |
| 5,568,676 A | 10/1996 | Freeman |
| 5,570,933 A | 11/1996 | Rouhana et al. |
| 5,579,785 A | 12/1996 | Bell |
| 5,584,107 A | 12/1996 | Koyanagi et al. |
| 5,588,189 A | 12/1996 | Gorman et al. |
| 5,606,783 A | 3/1997 | Gillis et al. |
| 5,622,327 A | 4/1997 | Heath et al. |
| 5,628,548 A | 5/1997 | Lacoste |
| 5,634,664 A | 6/1997 | Seki et al. |
| 5,640,468 A | 6/1997 | Hsu |
| 5,669,572 A | 9/1997 | Crook |
| 5,669,663 A | 9/1997 | Feuerherdt |
| 5,695,243 A | 12/1997 | Anthony et al. |
| 5,699,594 A | 12/1997 | Czank et al. |
| D389,426 S | 1/1998 | Merrick et al. |
| 5,722,689 A | 3/1998 | Chen et al. |
| 5,743,597 A | 4/1998 | Jessup et al. |
| 5,765,774 A | 6/1998 | Maekawa et al. |
| 5,774,947 A | 7/1998 | Anscher |
| 5,779,319 A | 7/1998 | Merrick |
| D397,063 S | 8/1998 | Woellert et al. |
| 5,788,281 A | 8/1998 | Yanagi et al. |
| 5,788,282 A | 8/1998 | Lewis |
| 5,794,878 A | 8/1998 | Carpenter et al. |
| 5,806,148 A | 9/1998 | McFalls et al. |
| 5,813,097 A | 9/1998 | Woellert et al. |
| 5,816,651 A | 10/1998 | Feuerherdt |
| 5,839,793 A | 11/1998 | Merrick et al. |
| 5,857,247 A | 1/1999 | Warrick et al. |
| 5,873,599 A | 2/1999 | Bauer et al. |
| 5,873,635 A | 2/1999 | Merrick |
| 5,882,084 A | 3/1999 | Verellen et al. |
| D407,667 S | 4/1999 | Homeier |
| 5,890,762 A | 4/1999 | Yoshida |
| 5,908,223 A | 6/1999 | Miller |

(56) References Cited

U.S. PATENT DOCUMENTS

| | | |
|---|---|---|
| 5,915,630 A | 6/1999 | Step |
| 5,918,934 A | 7/1999 | Siegrist |
| 5,934,760 A | 8/1999 | Schroth et al. |
| D416,827 S | 11/1999 | Anthony et al. |
| 5,979,026 A | 11/1999 | Anthony |
| 5,979,982 A | 11/1999 | Nakagawa |
| 5,996,192 A | 12/1999 | Haines et al. |
| 6,003,899 A | 12/1999 | Chaney |
| 6,017,087 A | 1/2000 | Anthony et al. |
| 6,030,046 A | 2/2000 | Dorow |
| 6,056,320 A | 5/2000 | Khalifa et al. |
| 6,065,367 A | 5/2000 | Schroth et al. |
| 6,065,777 A | 5/2000 | Merrick |
| 6,082,819 A | 7/2000 | Jackson |
| 6,123,388 A | 9/2000 | Vits et al. |
| 6,182,783 B1 | 2/2001 | Bayley |
| 6,183,044 B1 | 2/2001 | Koyanagi et al. |
| 6,193,310 B1 | 2/2001 | Batalaris et al. |
| RE37,123 E | 4/2001 | Templin et al. |
| 6,209,957 B1 | 4/2001 | Baloga et al. |
| 6,224,154 B1 | 5/2001 | Stoki |
| 6,230,370 B1 | 5/2001 | Nelsen |
| 6,234,572 B1 | 5/2001 | Shiino et al. |
| 6,260,884 B1 | 7/2001 | Bittner et al. |
| 6,276,754 B1 | 8/2001 | Youssef-Agha et al. |
| 6,295,700 B1 | 10/2001 | Plzak |
| 6,309,024 B1 | 10/2001 | Busch |
| 6,312,015 B1 | 11/2001 | Merrick et al. |
| 6,315,232 B1 | 11/2001 | Merrick |
| 6,322,140 B1 | 11/2001 | Jessup et al. |
| 6,322,149 B1 | 11/2001 | Conforti et al. |
| 6,325,412 B1 | 12/2001 | Pan et al. |
| 6,328,379 B1 | 12/2001 | Merrick et al. |
| 6,343,841 B1 | 2/2002 | Gregg et al. |
| 6,351,717 B2 | 2/2002 | Lambrecht |
| 6,357,790 B1 | 3/2002 | Swann et al. |
| 6,358,591 B1 | 3/2002 | Smith |
| 6,363,591 B1 | 4/2002 | Bell et al. |
| 6,367,882 B1 | 4/2002 | Van Druff et al. |
| 6,374,168 B1 | 4/2002 | Fujii |
| 6,400,145 B1 | 6/2002 | Chamings et al. |
| 6,412,863 B1 | 7/2002 | Merrick et al. |
| 6,418,596 B2 | 7/2002 | Haas et al. |
| 6,419,199 B1 | 7/2002 | Skofljanec et al. |
| 6,425,632 B1 | 7/2002 | Anthony et al. |
| 6,442,807 B1 | 9/2002 | Adkisson |
| 6,446,272 B1 | 9/2002 | Lee et al. |
| 6,463,638 B1 | 10/2002 | Pontaoe |
| 6,467,849 B1 | 10/2002 | Deptolla et al. |
| 6,485,057 B1 | 11/2002 | Midorikawa et al. |
| 6,485,098 B1 | 11/2002 | Vits et al. |
| 6,508,515 B2 | 1/2003 | Vits et al. |
| 6,510,593 B1 | 1/2003 | Kim |
| 6,513,208 B1 | 2/2003 | Sack et al. |
| 6,520,392 B2 | 2/2003 | Thibodeau et al. |
| 6,543,101 B2 | 4/2003 | Sack et al. |
| 6,547,273 B2 | 4/2003 | Grace et al. |
| 6,560,825 B2 | 5/2003 | Maciejczyk et al. |
| 6,566,869 B2 | 5/2003 | Chamings et al. |
| 6,588,077 B2 | 7/2003 | Katsuyama et al. |
| 6,592,149 B2 | 7/2003 | Sessoms |
| 6,606,770 B1 | 8/2003 | Badrenas Buscart |
| 6,619,753 B2 | 9/2003 | Takayama |
| 6,631,926 B2 | 10/2003 | Merrick et al. |
| 6,665,912 B2 | 12/2003 | Turner et al. |
| 6,669,288 B2 | 12/2003 | Nakagawa et al. |
| 6,694,577 B2 | 2/2004 | Di Perrero et al. |
| 6,711,790 B2 | 3/2004 | Pontaoe |
| 6,719,233 B2 | 4/2004 | Specht et al. |
| 6,719,326 B2 | 4/2004 | Schroth et al. |
| 6,722,601 B2 | 4/2004 | Kohlndorfer et al. |
| 6,722,697 B2 | 4/2004 | Krauss et al. |
| 6,733,041 B2 | 5/2004 | Arnold et al. |
| 6,739,541 B2 | 5/2004 | Palliser et al. |
| 6,749,150 B2 | 6/2004 | Kohlndorfer et al. |
| 6,763,557 B2 | 7/2004 | Steiff et al. |
| 6,769,157 B1 | 8/2004 | Meal |
| 6,786,294 B2 | 9/2004 | Specht et al. |
| 6,786,510 B2 | 9/2004 | Roychoudhury et al. |
| 6,786,511 B2 | 9/2004 | Heckmayr et al. |
| 6,793,291 B1 | 9/2004 | Kocher |
| 6,796,007 B1 | 9/2004 | Anscher |
| 6,802,470 B2 | 10/2004 | Smithson et al. |
| 6,820,310 B2 | 11/2004 | Woodard et al. |
| 6,820,902 B2 | 11/2004 | Kim |
| 6,834,822 B2 | 12/2004 | Koning et al. |
| 6,836,754 B2 | 12/2004 | Cooper |
| 6,837,519 B2 | 1/2005 | Moskalik et al. |
| 6,840,544 B2 | 1/2005 | Prentkowski |
| 6,851,160 B2 | 2/2005 | Carver |
| 6,857,326 B2 | 2/2005 | Specht et al. |
| 6,860,671 B2 | 3/2005 | Schulz |
| 6,863,235 B2 | 3/2005 | Koning et al. |
| 6,863,236 B2 | 3/2005 | Kempf et al. |
| 6,868,585 B2 | 3/2005 | Anthony et al. |
| 6,868,591 B2 | 3/2005 | Dingman et al. |
| 6,871,876 B2 | 3/2005 | Xu |
| 6,874,819 B2 | 4/2005 | O'Neill |
| 6,882,914 B2 | 4/2005 | Gioutsos et al. |
| 6,886,889 B2 | 5/2005 | Vits et al. |
| 6,896,291 B1 | 5/2005 | Peterson |
| 6,902,193 B2 | 6/2005 | Kim et al. |
| 6,913,288 B2 | 7/2005 | Schulz et al. |
| 6,916,045 B2 | 7/2005 | Clancy, III et al. |
| 6,921,136 B2 | 7/2005 | Bell et al. |
| 6,922,875 B2 | 8/2005 | Sato et al. |
| 6,931,669 B2 | 8/2005 | Ashline |
| 6,935,701 B1 | 8/2005 | Arnold et al. |
| 6,948,219 B2 | 9/2005 | Kakuda et al. |
| 6,951,350 B2 | 10/2005 | Heidorn et al. |
| 6,957,789 B2 | 10/2005 | Bowman et al. |
| 6,959,946 B2 | 11/2005 | Desmarais et al. |
| 6,962,394 B2 | 11/2005 | Anthony et al. |
| 6,966,518 B2 | 11/2005 | Kohlndorfer et al. |
| 6,969,022 B2 | 11/2005 | Bell et al. |
| 6,969,122 B2 | 11/2005 | Sachs et al. |
| 6,993,436 B2 | 1/2006 | Specht et al. |
| 6,997,474 B2 | 2/2006 | Midorikawa et al. |
| 6,997,479 B2 | 2/2006 | Desmarais et al. |
| 7,010,836 B2 | 3/2006 | Acton et al. |
| D519,406 S | 4/2006 | Merrill et al. |
| 7,025,297 B2 | 4/2006 | Bell et al. |
| 7,029,067 B2 | 4/2006 | Vits et al. |
| 7,040,696 B2 | 5/2006 | Vits et al. |
| 7,073,233 B2 | 7/2006 | Leva et al. |
| 7,073,866 B1 | 7/2006 | Berdahl |
| 7,077,475 B2 | 7/2006 | Boyle |
| 7,080,856 B2 | 7/2006 | Desmarais et al. |
| 7,083,147 B2 | 8/2006 | Movsesian et al. |
| 7,100,991 B2 | 9/2006 | Schroth et al. |
| 7,108,114 B2 | 9/2006 | Mori et al. |
| 7,118,133 B2 | 10/2006 | Bell et al. |
| 7,131,667 B2 | 11/2006 | Bell et al. |
| 7,137,648 B2 | 11/2006 | Schulz et al. |
| 7,137,650 B2 | 11/2006 | Bell et al. |
| 7,140,571 B2 | 11/2006 | Hishon et al. |
| 7,144,085 B2 | 12/2006 | Vits et al. |
| 7,147,251 B2 | 12/2006 | Bell et al. |
| 7,152,926 B2 | 12/2006 | Wrobel |
| D535,214 S | 1/2007 | Kolasa |
| 7,159,285 B2 | 1/2007 | Karlsson et al. |
| 7,180,258 B2 | 2/2007 | Specht et al. |
| 7,182,370 B2 | 2/2007 | Arnold |
| 7,210,707 B2 | 5/2007 | Schroth et al. |
| 7,216,827 B2 | 5/2007 | Tanaka et al. |
| 7,219,929 B2 | 5/2007 | Bell et al. |
| 7,232,154 B2 | 6/2007 | Desmarais et al. |
| 7,237,741 B2 | 7/2007 | Specht et al. |
| 7,240,405 B2 | 7/2007 | Webber et al. |
| 7,240,924 B2 | 7/2007 | Kohlndorfer et al. |
| 7,246,854 B2 | 7/2007 | Dingman et al. |
| 7,263,750 B2 | 9/2007 | Keene et al. |
| 7,278,684 B2 | 10/2007 | Boyle |
| D555,358 S | 11/2007 | King |

(56) References Cited

U.S. PATENT DOCUMENTS

| | | |
|---|---|---|
| 7,300,013 B2 | 11/2007 | Morgan et al. |
| 7,341,216 B2 | 3/2008 | Heckmayr et al. |
| 7,353,572 B2 | 4/2008 | Claus et al. |
| 7,360,287 B2 | 4/2008 | Cerruti et al. |
| 7,367,590 B2 | 5/2008 | Koning et al. |
| 7,377,464 B2 | 5/2008 | Morgan |
| 7,384,014 B2 | 6/2008 | Ver Hoven et al. |
| 7,395,585 B2 | 7/2008 | Longley et al. |
| 7,404,239 B1 | 7/2008 | Walton et al. |
| 7,407,193 B2 | 8/2008 | Yamaguchi et al. |
| D578,931 S | 10/2008 | Toltzman et al. |
| 7,452,003 B2 | 11/2008 | Bell |
| 7,455,256 B2 | 11/2008 | Morgan |
| 7,461,866 B2 | 12/2008 | Desmarais et al. |
| 7,475,840 B2 | 1/2009 | Heckmayr |
| 7,477,139 B1 | 1/2009 | Cuevas |
| 7,481,399 B2 | 1/2009 | Nohren et al. |
| 7,506,413 B2 | 3/2009 | Dingman et al. |
| 7,516,808 B2 | 4/2009 | Tanaka |
| 7,520,036 B1 | 4/2009 | Baldwin et al. |
| D592,543 S | 5/2009 | Kolasa |
| D592,830 S | 5/2009 | Whiteside |
| 7,533,902 B2 | 5/2009 | Arnold et al. |
| 7,547,043 B2 | 6/2009 | Kokeguchi et al. |
| 7,614,124 B2 | 11/2009 | Keene et al. |
| 7,631,830 B2 | 12/2009 | Boelstler et al. |
| D610,036 S | 2/2010 | Balensiefer, II |
| 7,669,794 B2 | 3/2010 | Boelstler et al. |
| 7,673,945 B1 | 3/2010 | Riffel et al. |
| 7,698,791 B2 | 4/2010 | Pezza |
| 7,716,795 B2 * | 5/2010 | Versellie et al. ............. 24/593.1 |
| 7,722,081 B2 | 5/2010 | Van Druff et al. |
| 7,739,019 B2 | 6/2010 | Robert et al. |
| 7,753,410 B2 | 7/2010 | Coultrup |
| 7,775,557 B2 | 8/2010 | Bostrom et al. |
| RE41,790 E | 10/2010 | Stanley |
| 7,810,220 B2 | 10/2010 | Anthony et al. |
| 7,861,341 B2 | 1/2011 | Ayette et al. |
| 7,862,124 B2 | 1/2011 | Dingman |
| 7,871,132 B2 * | 1/2011 | Rogers ........................ 297/469 |
| D632,611 S | 2/2011 | Buscart |
| 7,918,001 B2 | 4/2011 | Buckingham |
| D637,518 S | 5/2011 | Chen |
| 7,934,775 B2 | 5/2011 | Walker et al. |
| 7,945,975 B2 | 5/2011 | Thomas et al. |
| 8,011,730 B2 | 9/2011 | Greenwood |
| 8,037,581 B2 | 10/2011 | Gray et al. |
| 8,096,027 B2 | 1/2012 | Jung et al. |
| 8,240,012 B2 | 8/2012 | Walega et al. |
| 8,240,767 B2 | 8/2012 | Greenwood |
| 8,291,555 B2 | 10/2012 | Buckingham et al. |
| 8,387,216 B1 | 3/2013 | Martinson |
| 8,567,022 B2 | 10/2013 | Keene et al. |
| 8,627,554 B1 | 1/2014 | Hagan et al. |
| 2002/0089163 A1 | 7/2002 | Bedewi et al. |
| 2002/0135175 A1 | 9/2002 | Schroth |
| 2003/0015863 A1 | 1/2003 | Brown et al. |
| 2003/0027917 A1 | 2/2003 | Namiki et al. |
| 2003/0085608 A1 | 5/2003 | Girardin |
| 2003/0197415 A1 | 10/2003 | Dingman |
| 2004/0007909 A1 | 1/2004 | Bonk |
| 2004/0084953 A1 | 5/2004 | Hansen |
| 2004/0169411 A1 | 9/2004 | Murray |
| 2004/0174063 A1 | 9/2004 | Kocher |
| 2004/0195900 A1 | 10/2004 | The et al. |
| 2004/0208692 A1 | 10/2004 | Anthony et al. |
| 2004/0217583 A1 | 11/2004 | Wang |
| 2004/0227390 A1 | 11/2004 | Schroth |
| 2004/0251367 A1 | 12/2004 | Suzuki et al. |
| 2005/0073187 A1 | 4/2005 | Frank et al. |
| 2005/0107932 A1 | 5/2005 | Bolz et al. |
| 2005/0127660 A1 | 6/2005 | Liu |
| 2005/0175253 A1 | 8/2005 | Li et al. |
| 2005/0179244 A1 | 8/2005 | Schroth |
| 2005/0206151 A1 | 9/2005 | Ashline |
| 2005/0284977 A1 | 12/2005 | Specht et al. |
| 2006/0071535 A1 | 4/2006 | Kim et al. |
| 2006/0075609 A1 | 4/2006 | Dingman et al. |
| 2006/0097095 A1 | 5/2006 | Boast |
| 2006/0186675 A1 | 8/2006 | Suzumura et al. |
| 2006/0237573 A1 | 10/2006 | Boelstler et al. |
| 2006/0243070 A1 | 11/2006 | Van Druff et al. |
| 2006/0250013 A1 | 11/2006 | Shao |
| 2006/0267394 A1 | 11/2006 | David et al. |
| 2006/0277727 A1 | 12/2006 | Keene et al. |
| 2007/0067970 A1 | 3/2007 | Claus et al. |
| 2007/0080528 A1 | 4/2007 | Itoga et al. |
| 2007/0241549 A1 | 10/2007 | Boelstler et al. |
| 2007/0257480 A1 | 11/2007 | Van Druff et al. |
| 2008/0018156 A1 | 1/2008 | Hammarskjold et al. |
| 2008/0054615 A1 | 3/2008 | Coultrup |
| 2008/0093833 A1 | 4/2008 | Odate |
| 2008/0100051 A1 | 5/2008 | Bell et al. |
| 2008/0100122 A1 | 5/2008 | Bell et al. |
| 2008/0136246 A1 | 6/2008 | Salter |
| 2008/0172847 A1 | 7/2008 | Keene et al. |
| 2008/0224460 A1 | 9/2008 | Erez |
| 2009/0014991 A1 | 1/2009 | Smyth et al. |
| 2009/0069983 A1 | 3/2009 | Humbert et al. |
| 2009/0179412 A1 | 7/2009 | Gray et al. |
| 2009/0183348 A1 | 7/2009 | Walton et al. |
| 2009/0212549 A1 | 8/2009 | Jones |
| 2009/0241305 A1 | 10/2009 | Buckingham |
| 2009/0243310 A1 | 10/2009 | Buckingham et al. |
| 2010/0013282 A1 | 1/2010 | Balensiefer |
| 2010/0046843 A1 | 2/2010 | Ma et al. |
| 2010/0115737 A1 | 5/2010 | Foubert |
| 2010/0125983 A1 | 5/2010 | Keene et al. |
| 2010/0146749 A1 | 6/2010 | Jung |
| 2010/0213753 A1 | 8/2010 | Humbert |
| 2010/0219667 A1 | 9/2010 | Merrill et al. |
| 2010/0247230 A1 | 9/2010 | Buckingham et al. |
| 2011/0010901 A1 | 1/2011 | Holler |
| 2011/0043402 A1 | 2/2011 | Sasakawa |
| 2011/0057500 A1 | 3/2011 | Walker et al. |
| 2011/0243653 A1 | 10/2011 | Buckingham et al. |
| 2012/0242134 A1 | 9/2012 | Siegel |
| 2012/0292893 A1 | 11/2012 | Baca et al. |
| 2013/0127229 A1 | 5/2013 | Humbert |

FOREIGN PATENT DOCUMENTS

| | | |
|---|---|---|
| CA | 2112960 | 7/1994 |
| CA | 2450744 | 2/2003 |
| CA | 2450995 | 2/2003 |
| CA | 2522705 | 11/2004 |
| DE | 4019402 | 12/1991 |
| DE | 4421688 | 12/1995 |
| DE | 69019765 | 2/1996 |
| DE | 19848231 | 8/1999 |
| DE | 19946579 | 4/2001 |
| EP | 26564 | 4/1981 |
| EP | 0363062 | 4/1990 |
| EP | 0380442 | 8/1990 |
| EP | 0401455 | 12/1990 |
| EP | 0404730 | 12/1990 |
| EP | 0449772 | 10/1991 |
| EP | 0519296 | 12/1992 |
| EP | 0560184 | 9/1993 |
| EP | 0561274 | 9/1993 |
| EP | 0566856 | 10/1993 |
| EP | 0608564 | 8/1994 |
| EP | 0619201 | 10/1994 |
| EP | 0619202 | 10/1994 |
| EP | 0646491 | 4/1995 |
| EP | 0703113 | 3/1996 |
| EP | 0714806 | 6/1996 |
| EP | 0841209 | 5/1998 |
| EP | 0952032 | 10/1999 |
| EP | 0970842 | 1/2000 |
| EP | 0982182 | 3/2000 |
| EP | 1059194 | 12/2000 |
| EP | 1099602 | 5/2001 |
| EP | 1153789 | 11/2001 |

(56) References Cited

FOREIGN PATENT DOCUMENTS

| | | |
|---|---|---|
| EP | 1231100 | 8/2002 |
| EP | 1414680 | 5/2004 |
| EP | 1439977 | 7/2004 |
| EP | 1447021 | 8/2004 |
| EP | 1472949 | 11/2004 |
| EP | 1628525 | 3/2006 |
| FR | 1298012 | 7/1962 |
| FR | 2782483 | 2/2000 |
| GB | 888436 | 1/1962 |
| GB | 1047761 | 11/1966 |
| GB | 1582973 | 1/1981 |
| GB | 2055952 | 3/1981 |
| GB | 2346083 | 8/2000 |
| GB | 2349813 | 11/2000 |
| GB | 2356890 | 6/2001 |
| GB | 2365916 | 2/2002 |
| JP | 52055120 | 5/1977 |
| JP | 63141852 | 9/1988 |
| JP | 63247150 | 10/1988 |
| JP | 10119611 | 5/1998 |
| JP | 2001138858 | 5/2001 |
| JP | 2002012069 | 1/2002 |
| WO | WO-8603386 | 6/1986 |
| WO | WO-03009717 | 2/2003 |
| WO | WO-03010024 | 2/2003 |
| WO | WO-03010035 | 2/2003 |
| WO | WO-2004004507 | 1/2004 |
| WO | WO-2004093533 | 11/2004 |
| WO | WO-2006041859 | 4/2006 |
| WO | WO-2009009789 | 1/2009 |
| WO | WO-2009124084 | 10/2009 |
| WO | WO-2010/027853 | 3/2010 |
| WO | WO-2010114571 | 10/2010 |
| WO | WO-2010147723 | 12/2010 |

OTHER PUBLICATIONS

Global Seating Systems LLC, "CCOPS," Cobra: Soldier Survival System, 1 page, undated. [Color Copy].
Holmbergs, "Art.no. 63/4959-XX and 63/4958-XX Gr.1 Buckle, 3/5 point." Accessed Sep. 15, 2010. www.holmbergs.se. (2 pages).
Holmbergs, "Gr. 0+ 3-point buckle with plastic chassis and tongues." Accessed Sep. 15, 2010. www.holmbergs.se. (1 page).
Holmbergs, "Gr. 1 Buckle, Viking." Accessed Sep. 15, 2010. www.holmbergs.se. (1 page).
Holmbergs, "Group 1 Systems." Accessed Sep. 15, 2010. www.holmbergs.se. (1 page).
Holmbergs, "Infant buckle with steel tongues." Accessed Sep. 15, 2010. www.holmbergs.se. (1 page).
Holmbergs, "Infant buckle. 5-point with plastic chassis and plastic tongues." Accessed Sep. 15, 2010. www.holmbergs.se. (1 page).
Novarace, "DL: Group 1 Buckle." Accessed Sep. 15, 2010. www.novarace.com. (1 page).
Novarace, "GT 3: Group 0 Buckle." Accessed Sep. 15, 2010. www.novarace.com. (1 page).
Novarace, "GT 5: Group 0 Buckle." Accessed Sep. 15, 2010. www.novarace.com (1 page).
Novarace, "GT: Group 1 Buckle." Accessed Oct. 8, 2010. www.novarace.com. (1 page).
Novarace, "KMA 1: Group 1 Buckle." Accessed Sep. 15, 2010. www.novarace.com. (1 page).
Sabelt Catalog, "SAB104: Standard tongue hole to facilitate webbing insert," p. 23 (1 page).
Sabelt, "Daphne 0: Fiberglass-plastic buckle with metal pin latch." Accessed Sep. 15, 2010. www.sabelt.com (1 page).
Sabelt, "RO1000: Fiberglass-plastic buckle with metal pin latch." Accessed Sep. 15, 2010. www.sabelt.com (1 page).
Sabelt, "SAB004: Fiberglass-plastic buckle with metal pin latch." Accessed Sep. 15, 2010. www. sabelt.com. (1 page).
Sabelt, "SABUSA004: Fiberglass-plastic buckle with metal pin latch." Accessed Sep. 15, 2010. www.sabelt.com. (1 page).
Schroth Safety Products, Installation Instructions, HMMWV Gunner restraint, Single Lower with Swivel—M1151, Revision: A, Jul. 28, 2006, pp. 1-10.
Toltzman, Randall and Shaul, Rich; "Buckle Assembly"; U.S. Appl. No. 29/297,210, filed Nov. 6, 2007, electronic copy located at www.uspto.gov.
"ExxonMobil Santoprene 221-55 Thermoplastic Elastomer" materials sheet. Retrieved from http://www.matweb.com/search/datasheet.aspx?matguid=67de0de851854bb085afcfac35e294f5&ckck=1 on Jul. 8, 2013.
ASTM D395-03 (Reapproved 2008) "Standard Test Methods for Rubber Property—Compression Set", Retrieved from http://enterprise2.astm.org/DOWNLOAD/D395.1656713-1.pdf on Jul. 9, 2013.
Holmbergs, ISOFIX—Connectors, Oct. 18, 2010, 1 page.
Holmbergs, Isofix Connector C2, http://www.holmbergs.se/1/1.0.1.0/47/1/ [accessed May 21, 2010], 2 pgs.
Novarace, EU ISOFIX http://www.novarace.com/index.php?option=com_content&task=view&id=42&Itemid=62 [accessed May 21, 2010], 1 page.
Novarace, NOVAFIX, http://www.novarace.com/index.php?option=com_content&task=view&id=43&Itemid=51 [accessed May 21, 2010], 1 page.
Sabelt Racing Seatbelts and Accessories, http://childsafety.sabelt.com/index.php/eshop/category/Sabelt-Racing-Seatbelts-and-Accessories.html?a=/1/frmCatID/290/ [accessed May 21, 2010], 3 pgs.
SafeGuard "Buckle Up With Confidence," IMMI, 2002, 12 pgs.
Safeguard "Child Protection, Seat Attachment Systems," Brochure, IMMI, 2001, 5 pgs.
SafeGuard "Child Seat Attachment Systems," IMMI, 1999, 2 pgs.
International Organization for Standardization (ISO), Draft Report of the 18th meeting of the WG 1 held on 10 and Nov. 11, 1997 in Orlando, Florida, 11 pgs.
U.S. Appl. No. 60/307,899, filed Jul. 26, 2001; Applicant Woodward; 16 pages.
U.S. Appl. No. 60/395,099, filed Jul. 5, 2002; Applicant: Woodward; 47 pages.

* cited by examiner

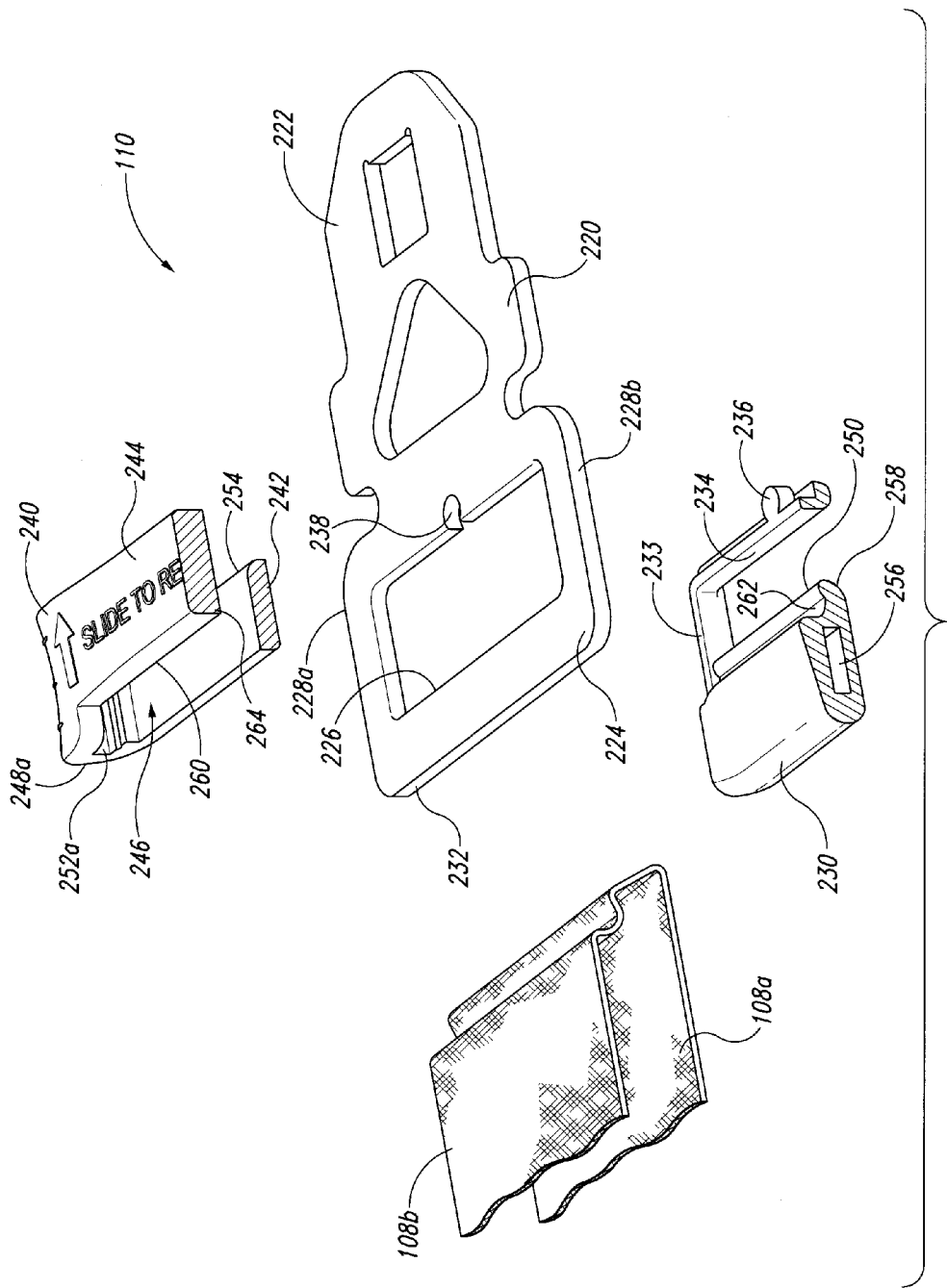

SEATBELT BUCKLE TONGUE ASSEMBLY

TECHNICAL FIELD

The present disclosure is directed generally to personal restraint systems for use in vehicles and, more particularly, to seatbelt buckle tongue assemblies.

BACKGROUND

Conventional 3-point seatbelt systems typically include both a lap belt and a shoulder belt which are simultaneously drawn across a seat occupant and attached to a buckle mounted adjacent the seat. The lap belt and shoulder belt are typically formed from a single loop of web that is divided into the two belt sections by a buckle tongue that is attached to the buckle. One end of this web is typically fixed to an anchor point on the floor of the vehicle opposite the buckle, and the other end is typically wound onto a spring-loaded retractor that maintains tension in the web when in use and retracts the web when not in use. The retractor can be mounted to the floor opposite the buckle, or it can be mounted to an interior wall of the vehicle adjacent to the seat. The web typically extends upward from the retractor and through a D-ring or other guide feature mounted to the interior wall, and then diagonally downward across the seat to form the shoulder portion of the seatbelt. The web then passes through the tongue and back across the seat to the anchor point to form the lap portion of the seatbelt.

The buckle tongue on conventional 3-point seatbelt systems is typically able to slide up and down on the web. This makes the seatbelt easy to put on or take off, and enables the retractor to maintain a comfortable level of tension in the seatbelt during use. This feature also allows the retractor to fully retract the unbuckled seatbelt without the buckle tongue becoming hung up on the D-ring.

Although allowing the buckle tongue to slide on the web may be advantageous during routine use, it may also be desirable to lock the buckle tongue on the web during a rough ride, impact or crash to prevent the web from passing through the tongue and loosening, for example, the lap belt during such an event. Conventional buckle tongues typically rely on constant tension in the lap belt to remain locked on the web. In a vehicle that typically experiences rough riding conditions, (e.g., such as an off road vehicle (ORV) or a recreational utility vehicle (RUV)), however, the loads in the lap belt tend to vary as the occupant jostles around, and as a result there will be little or no tension in the belt at times. If tension is momentarily lost, the buckle tongue will momentarily unlock and allow a small amount of web to pass through the buckle tongue before the subsequent tension in the belt relocks the tongue on the web. As a result of the varying tension, the belt may creep through the buckle tongue and inadvertently loosen on the occupant. Accordingly, it would be advantageous to provide a buckle tongue for use with a 3-point seatbelt system that reduces or eliminates belt creep under rough riding conditions.

BRIEF DESCRIPTION OF THE DRAWINGS

FIG. 2B is a partially cross-sectional, exploded isometric view of the buckle tongue assembly.

DETAILED DESCRIPTION

Figure 1:
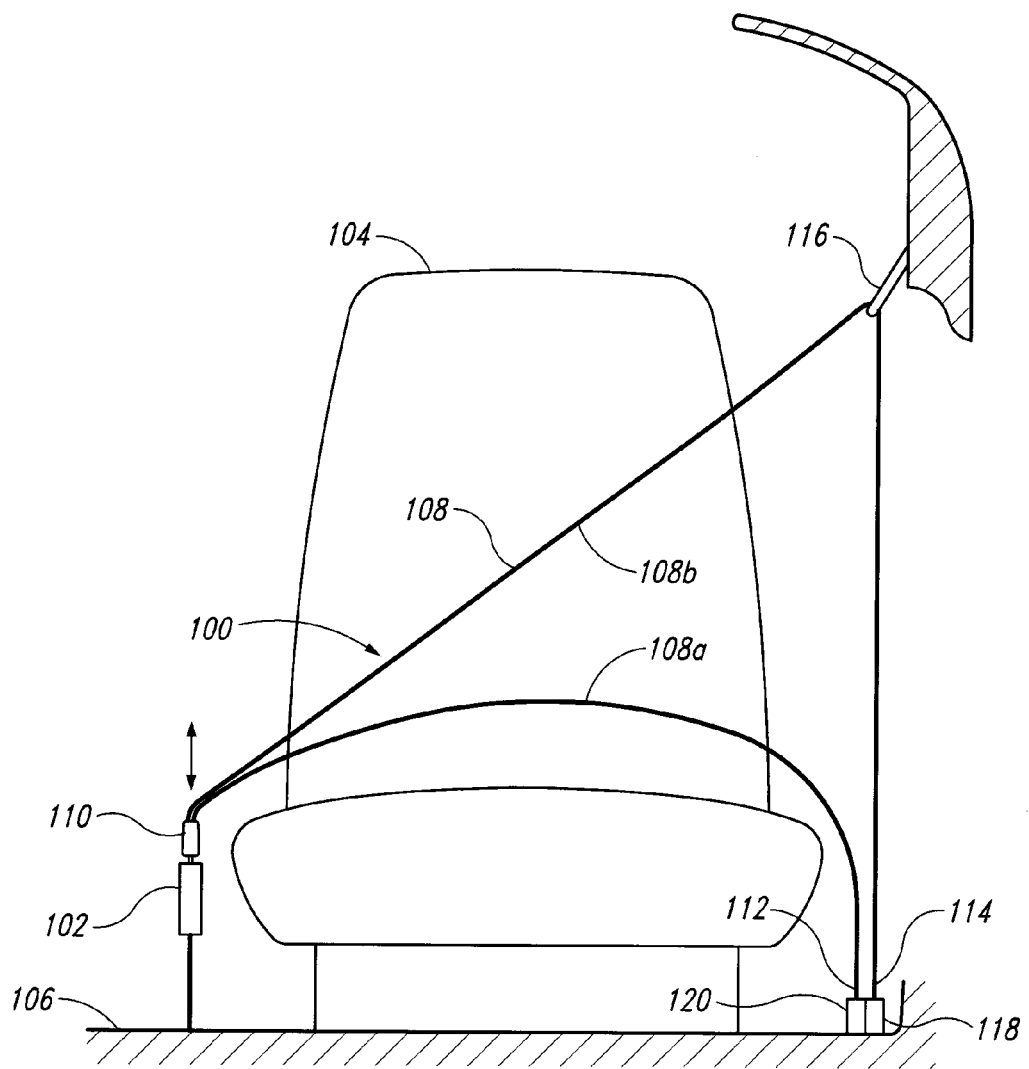
FIG. 1 is a front view of a personal restraint system having a buckle tongue assembly configured in accordance with an embodiment of the present technology.

The following disclosure describes various embodiments of buckle tongue assemblies for use with 3-point seatbelt systems and other types of personal restraint systems used in land vehicles and other vehicles. By way of example, a buckle tongue assembly configured in accordance with one embodiment of the present technology includes a metal plate having an aperture toward one end and a tongue portion toward the other end. The aperture is configured to receive a seatbelt web, and the tongue portion is configured to be releasably engaged with a corresponding buckle assembly. Plastic material (e.g., an "overmold") is molded or otherwise attached to a portion of the plate, and forms a first web gripping portion adjacent to the aperture. A handle slides back and forth on the plate and includes a second web gripping portion configured to cooperate with the first web gripping portion. In operation, the tongue assembly is able to slide on the web when the handle is moved away from the overmold, as this disengages the two web gripping portions. Such movement of the tongue assembly would be desirable, for example, during installation or removal of the restraint system. Conversely, the tongue assembly can be locked onto the web by moving the handle back toward the overmold, as this clamps the web between the first and second web gripping portions and engages the two web gripping portions.

Certain details are set forth in the following description and in FIGS. 1-4 to provide a thorough understanding of various embodiments of the present technology. In other instances, well-known structures, materials, operations and/or systems often associated with seatbelts and other restraint systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Moreover, many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is a front view of an occupant restraint system 100 having a buckle tongue assembly 110 configured in accordance with an embodiment of the present technology. The restraint system 100 can be used to secure a person (not shown) in a vehicle seat 104. The buckle tongue assembly 110 ("tongue assembly 110") is slidably attached to a seatbelt or web 108. The web 108 can be of conventional seatbelt construction (e.g., woven nylon). The web 108 includes a first end portion 112 fixedly attached to an anchor 120 on a floor 106 of the vehicle, and a second end portion 114 that is attached to a conventional web retractor 118. In the illustrated embodiment, the web retractor 118 is mounted to the vehicle floor 106, but in other embodiments the web retractor 118 can be positioned in other suitable locations known to those of ordinary skill and the art, such as on an interior sidewall of the vehicle. The web 108 extends from the anchor 120 and loops through the tongue assembly 110 to form a lap web portion 108a. From the tongue assembly 110, the web 108 extends diagonally upward toward a D-ring or guide 116 mounted to an upper sidewall of the vehicle to form a shoulder web portion 108b. In the illustrated embodiment, the web 108 slidably passes through the guide 116 and then extends downwardly into the web retractor 118.

In operation, the occupant sits in the seat 104 and draws the tongue assembly 110 across his or her body to engage the tongue assembly 110 with a corresponding buckle assembly 102 in a conventional manner. The retractor 118 takes up any slack in the web 108, while still permitting the occupant to move around in comfort. As described in greater detail below, if sufficient tension is developed in the lap web portion 108a (for example, by occupant movement in response to bumpy road conditions) the tongue assembly 110 will automatically clamp or lock onto the web 108 and prevent loosening of the lap web portion 108a due to web creep through the tongue assembly 110. After the web tensioning event, the tongue assembly 110 can be manually released to permit the web 108 to again slide through the tongue assembly 110 and comfortably adjust to the occupant's position.

Figure 2A:
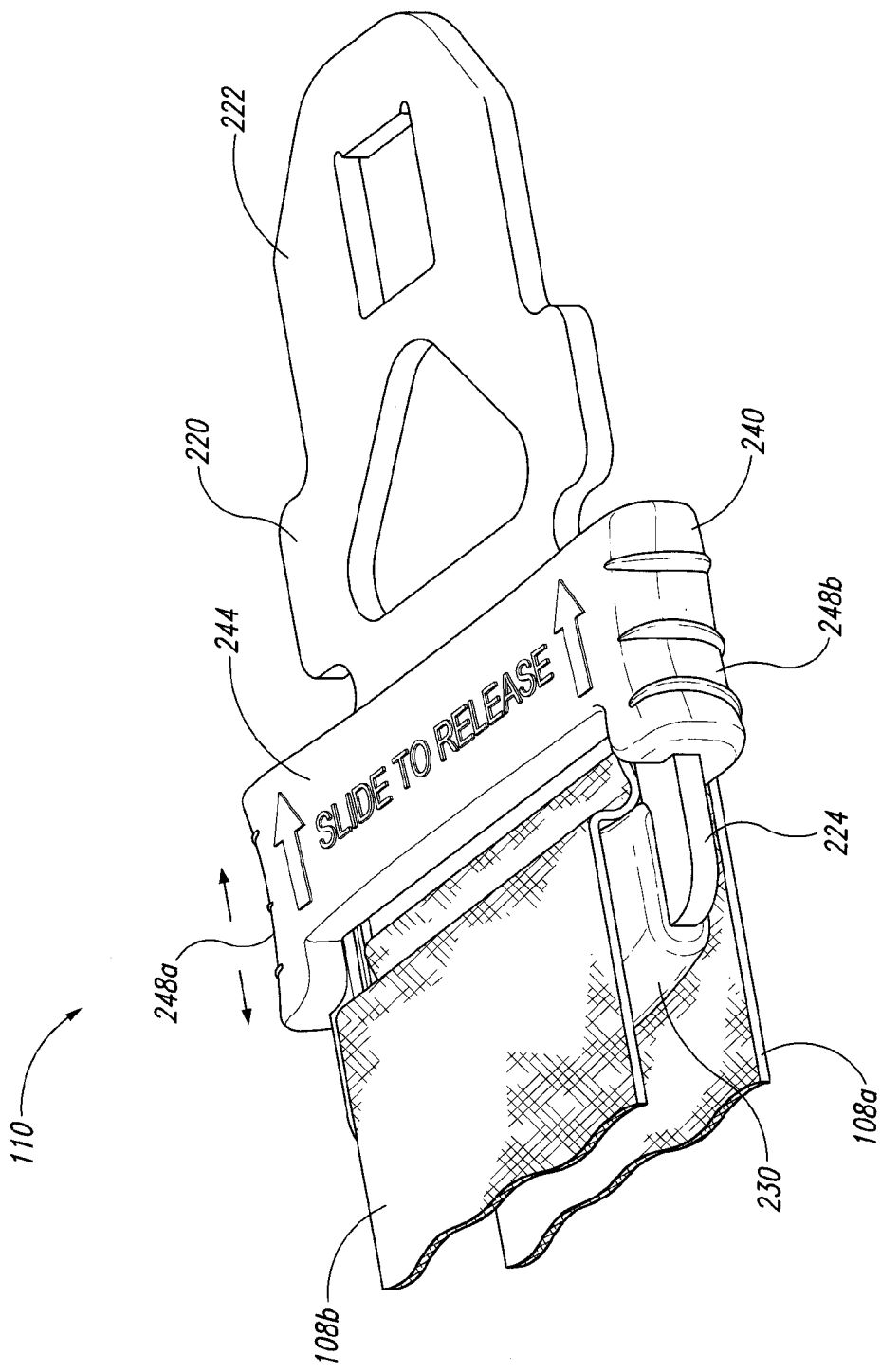
FIG. 2A is an enlarged isometric view of the buckle tongue assembly of FIG. 1.

FIG. 2A is an enlarged isometric view of the tongue assembly 110, and FIG. 2B is a partially cross-section, exploded isometric view of the tongue assembly 110. Referring to FIGS. 2A and 2B together, in the illustrated embodiment the tongue assembly 110 includes a plate 220 having a tongue portion 222 toward one end portion and a web guide aperture 226 toward an opposite end portion. The plate 220 can be stamped or otherwise formed from a suitable metal (e.g., sheet metal) in a conventional manner, and the tongue portion 222 can be shaped and sized as necessary to releasably engage the buckle assembly 102 (FIG. 1) in a conventional manner.

A web guide 230 is fixedly attached to the plate 220 proximate the web guide aperture 226. In the illustrated embodiment, the web guide 230 includes a frame portion 233 that lines the edges of the web guide aperture 226 and defines a generally rectangular web aperture 234. The frame portion 233 can include a tab 236 (e.g., a circular tab) or similar feature that snaps into or otherwise engages a corresponding opening or recess 238 in the plate 220 to secure the frame portion 233 in position around the web guide aperture 226. In this embodiment, the web guide 230 is cast or otherwise molded directly onto an aft portion of the plate 220 out of a plastic or other suitable material during a manufacturing process, and hence can be referred to herein as an "overmold." For example, the plastic material can be molded all the way around an aft cross bar 232 to secure the web guide 230 to the plate 220 adjacent to the web guide aperture 226. In other embodiments, however, it is contemplated that the web guide 230 can be formed using other suitable methods known in the art.

In one aspect of this embodiment, the web guide 230 can further include a first web gripping surface or portion 250 disposed proximate a forward facing edge of the web guide 230. In the illustrated embodiment, the first web gripping portion 250 includes a generally upward projecting lip, ridge or similar projection 258 transversely disposed across an aft portion of the web aperture 234. In addition, the first web gripping portion 250 also includes a channel, groove or recess 262 behind or adjacent to the projection 258. In the illustrated embodiment, the projection 258 and the recess 262 can have curved shapes that smoothly transition into each other and form, for example, an approximate "S" or sine wave shape. As explained detail below, this shape can facilitate clamping and/or locking the tongue assembly 110 to the web 108 during use of the restraint system 100. In other embodiments, the first web gripping portion 250 can have other suitable shapes consistent with the present disclosure, such as shapes having relatively flat surfaces, corners, etc.

In another aspect of this embodiment, the tongue assembly 110 further includes a handle or slider 240 which is movably coupled to the plate 220. In the illustrated embodiment, the slider 240 includes a lower portion or draw bar 242 that is spaced apart from an upper portion or cross bar 244 to define a web passage 246 therebetween. The draw bar 242 and the cross bar 244 are integrally connected by opposing side portions or sidewalls 248a and 248b. Each side wall 248a, b includes a corresponding slot, groove or channel 252a, b in an interior surface thereof that slidably engages a corresponding side edge portion 228a, b of the plate 220, enabling the slider 240 to translate (e.g. translate linearly) back and forth on the plate 220 relative to the web guide 230, as described in greater detail below.

In a further aspect of this embodiment, the draw bar 242 includes a web guide surface or portion 254 proximate a forward edge portion thereof. As described in greater detail below, the web 108 wraps around the web guide portion 254 when the restraint system 100 is properly installed on a seat occupant. The cross bar 244 includes a second web gripping portion 260 proximate an aft edge portion thereof. In the illustrated embodiment, the second web gripping portion 260 includes a generally downward projecting lip or projection 264 that, as explained in greater detail below, is configured to interlock or engage with the first web gripping portion 250 and clamp the web 108 therebetween when the slider 240 is moved sufficiently back on the plate 220 toward the web guide 230. In some embodiments, the slider 240 can be manufactured from a suitably durable plastic material known in the art using conventional methods (e.g., molding). In other embodiments, the slider 240 can be cast, machined, or otherwise formed from a suitable metal.

Figure 3:
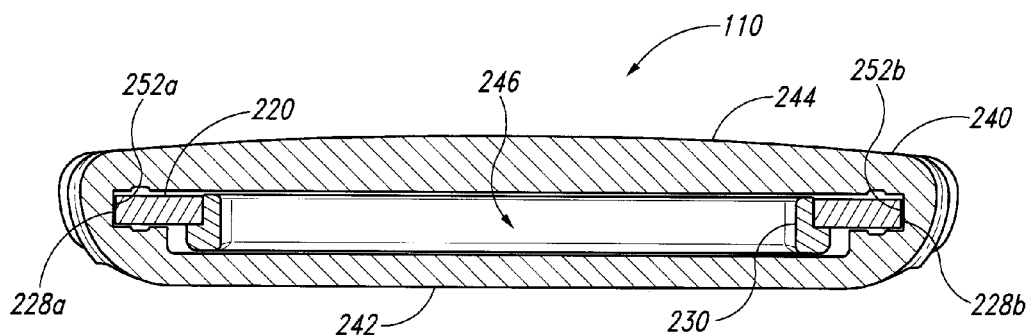
FIG. 3 is a cross-sectional end view of the buckle tongue assembly of FIGS. 1-2B.

FIG. 3 is an enlarged cross-sectional end view of the tongue assembly 110. As this view illustrates, the slider cross bar 244 is disposed on one side of the plate 220, and the draw bar 242 is disposed on the opposite side of the plate 220 to permit the web 108 (not shown in FIG. 3) to pass through the web passage 246 and loop back around the draw bar 242. The web guide frame 233 abuts the inner perimeter of the web guide aperture 226 in the plate 220. As mentioned above, the opposing channels 252a, b in the slider 240 receive the corresponding side edge portions 228a, b and enable the slider 240 to move back and forth on the plate 220.

Figure 4A:
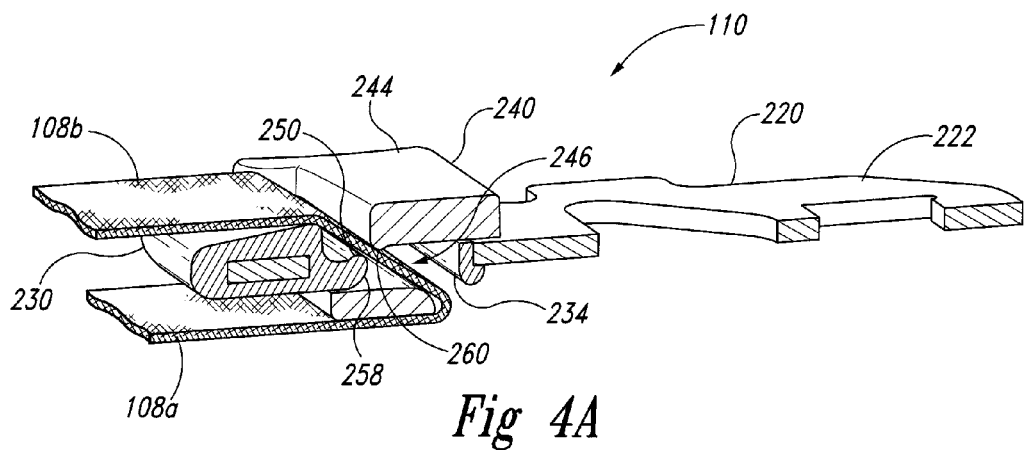
FIGS. 4A and 4B are cross-sectional side views of the buckle tongue assembly of FIGS. 1-3 illustrating two stages of operation in accordance with an embodiment of the present technology.
Figure 4B:
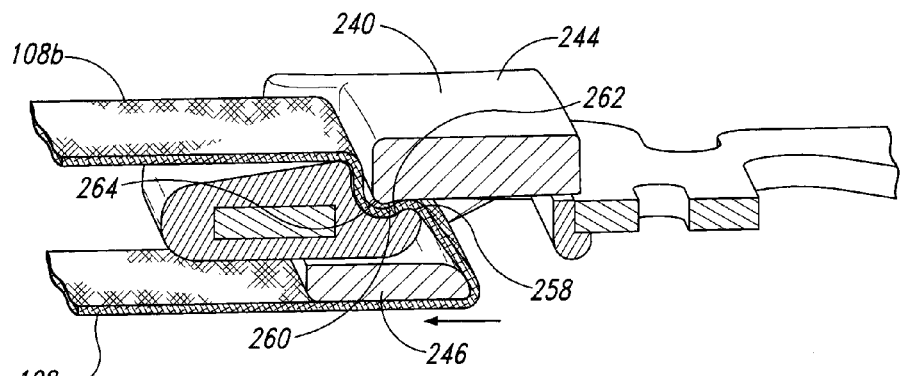

FIGS. 4A and 4B are enlarged side cross-sectional views illustrating two stages of operation of the tongue assembly 110 in accordance of an embodiment of the present technology. In FIG. 4A the slider 240 is shown in a forward or first position in which the second web gripping portion 260 is spaced apart from the first web gripping portion 250 to enable the web 108 to slidably pass between the two gripping portions. This slider position may be appropriate when, for example, the restraint system 100 is not in use, or when it is in use but the ride is sufficiently smooth that occupant is not being jostled around enough to put the lap web portion 108a in sufficient tension to automatically lock the web 108, as described in greater detail below.

FIG. 4B illustrates the tongue assembly 110 in the "locked" position. In this embodiment, the tongue assembly 110 can be automatically locked or manually locked. For example, the tongue assembly 110 can be automatically locked during a vehicle impact, deceleration/acceleration, and/or other dynamic event (e.g., rough riding conditions) if the event is of sufficient magnitude and direction to accelerate the occupant against the lap web portion 108a with sufficient force. More specifically, a sufficient force would put the lap web portion 108a in sufficient tension to pull the draw bar 242 back toward the web guide 230 and drive the second web gripping portion 260 over the first web gripping portion 250 to engage or interlock the two gripping portions as shown in FIG. 4B and clamp the web 108 therebetween. Alternatively, the slider 240 could be grasped by the occupant and manually pulled back toward the web guide 230 to lock the web.

Either way, as the slider 240 moves back from the first position shown in FIG. 4B to the second position shown in FIG. 4B, the second projection 264 of the second web gripping portion 260 presses the web 108 against the first projection 258, causing the first web gripping portion 250 to deform and/or deflect slightly downward. This enables the second projection 264 to pass over the first projection 258 and drop down into the recess 262 of the first web gripping portion 250, as shown in FIG. 4B. The overlapping, complimentary shapes of the first and second web gripping portions pinch or clamp the web 108 therebetween with sufficient force and/or friction to prevent or at least substantially restrict movement of the tongue assembly 110 on the web 108. Moreover, in contrast to conventional buckle tongue assemblies that require constant tension in the web to remain "locked" and can, as a result, allow slight movement of the web if tension is momentarily relieved, the buckle tongue assembly 110 of this embodiment remains locked on the web 108, even if tension in the lap web 108a is relieved. As a result, the buckle tongue assembly 110 of this embodiment prevents or at least substantially restricts the lap web 108a from loosening under rough ride conditions and/or during a crash or similar event.

Accordingly, as set forth above, sufficient tension in the lap web portion 108a (or manual movement of the slider 240) drives the second web gripping portion 260 over the first web gripping portion 250 and causes the opposing gripping portions to interlock or engage each other. The gripping portions 250, 260 remain in the "locked" position until the slider 240 is moved forward from the second position shown in FIG. 4B to the first position shown in FIG. 4A. This slider movement can be manually achieved by grasping the tongue portion 222 in one hand and the slider 240 in the other hand and moving the slider 240 away from the web guide 230 with sufficient force to cause the gripping portions 250, 260 to disengage. The slider 240 can also be released by grasping the tongue portion 222 in one hand and the shoulder web portion 108b in the other hand and pulling the shoulder web portion 108b back over the cross bar 244 and toward the tongue portion 222 with sufficient force to cause the gripping portions 250, 260 to disengage. As the foregoing discussion illustrates, the tongue assembly 110 allows the web 108 to self adjust to a proper and comfortable fit for the occupant until the occupant experiences a dynamic event of sufficient magnitude. During such an event, the tongue assembly 110 automatically locks into position on the web 108 and remains locked until the tongue assembly 110 is manually released by movement of the slider 240.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. A buckle tongue assembly comprising:
    a plate having a tongue portion configured to cooperatively engage a corresponding buckle assembly;
    a first web gripping portion carried by the plate, wherein the first web gripping portion includes a first projection projecting in a first direction; and
    a second web gripping portion movably carried by the plate—
        wherein the second web gripping portion includes a second projection projecting in a second direction, generally opposite to the first direction,
        wherein the second web gripping portion translates in a third direction relative to the first web gripping portion between a first position and a second position, the third direction being generally perpendicular to the first and second directions,
        wherein when the second web gripping portion is in the first position, the second projection is spaced apart from the first projection to permit movement of a web therebetween, and
        wherein when the second web gripping portion is in the second position, the second projection interlocks with the first projection to clamp the web between the first and second web gripping portions.

2. The buckle tongue assembly of claim 1 wherein the second web gripping portion moves linearly between the first position and the second position.

3. The buckle tongue assembly of claim 1 wherein the first web gripping portion includes a first edge portion and the second web gripping portion includes a second edge portion, and wherein the first edge portion overlaps the second edge portion when the second web gripping portion is in the second position.

4. The buckle tongue assembly of claim 1 wherein movement of the second web gripping includes a second projection, and wherein movement of the second web gripping portion from the first position to the second position drives the second projection over the first projection to clamp the web therebetween.

5. The buckle tongue assembly of claim 1 wherein at least one of the first and second projections has a curved shape.

6. The buckle tongue assembly of claim 1 wherein the first projection includes a first lip projecting in the first direction, and the second projection includes a second lip projecting in the second direction, wherein when the second web gripping portion is in the first position, the second lip is positioned on a first side of the first lip, and wherein when the second web gripping portion is in the second position, the second lip is positioned on a second side of the first lip, generally opposite to the first side.

7. The buckle tongue assembly of claim 1 wherein the first projection includes a first ridge extending transversely across the first web gripping portion, and wherein the second projection includes a second ridge extending transversely across the second web gripping portion.

8. The buckle tongue assembly of claim 1 wherein the first web gripping portion includes a channel adjacent to the first projection, and wherein the channel receives the second projection when the second web gripping portion is in the second position.

9. The buckle tongue assembly of claim 1 wherein the first web gripping portion includes a recess adjacent to the first projection, and wherein the first projection and the recess define an "S" shape.

10. The buckle tongue assembly of claim 1 wherein the first and second web gripping portions have complimentary shapes that interlock when the second web gripping portion is in the second position.

11. The buckle tongue assembly of claim 1, further comprising a handle slidably coupled to the plate, wherein the handle includes the second web gripping portion.

12. The buckle tongue assembly of claim 11 wherein the handle further includes a web guide portion spaced apart from the second web gripping portion to define a web path around the web guide portion, wherein tension in the web acting against the web guide portion pulls the second web gripping portion into the second position.

13. A buckle tongue assembly comprising:
    a plate having a tongue portion configured to cooperatively engage a corresponding buckle assembly;
    a first web gripping portion carried by the plate, wherein the first web gripping portion includes a first projection adjacent to a recess; and
    a second web gripping portion movably carried by the plate—
        wherein the second web gripping portion includes a second projection,
        wherein the second web gripping portion translates relative to the first web gripping portion between a first position and a second position,
        wherein when the second web gripping portion is in the first position, the second web gripping portion is spaced apart from the first web gripping portion to permit movement of a web therebetween,
        wherein movement of the second web gripping portion from the first position to the second position drives the second projection over the first projection and into the recess to clamp the web therebetween, and wherein when the second web gripping portion is in the second position, the second web gripping portion interlocks with the first web gripping portion.

14. The buckle tongue assembly of claim 13 wherein the second web gripping portion moves linearly between the first position and the second position.

15. The buckle tongue assembly of claim 13, further comprising a handle slidably coupled to the plate, wherein the handle includes the second web gripping portion and a web guide portion, wherein the web guide portion is spaced apart from the second web gripping portion to define a web path around the web guide portion, wherein tension in the web acting against the web guide portion pulls the second web gripping portion into the second position.

16. The buckle tongue assembly of claim 13 wherein the first projection includes a first lip, and wherein the second projection includes a second lip.

17. The buckle tongue assembly of claim 13 wherein the first projection and the recess define an "S" shape.

18. The buckle tongue assembly of claim 13 wherein the first and second web gripping portions have complimentary shapes that interlock when the second web gripping portion is in the second position.

19. A buckle tongue assembly for use with a personal restraint system in a vehicle, the tongue assembly comprising:
a plate having a web aperture and a tongue portion, wherein the tongue portion is configured to cooperatively engage a corresponding buckle assembly;
a first web gripping surface attached to the plate proximate the web aperture, wherein the first web gripping surface includes a first projection extending in a first direction;
a slider movably coupled to the plate, the slider having a cross-bar spaced apart from a draw-bar to define a web passage therebetween, wherein the cross-bar includes a second web gripping surface and the draw-bar includes a web guide surface, wherein the second web gripping surface includes a second projection extending in a second direction, generally opposite to the first projection, and wherein tension in a web passing through the web passage and around the guide surface pulls the slider in a third direction, generally perpendicular to the first and second directions, to drive the second projection over the first projection and interlock the second web gripping surface with the first web gripping surface to clamp the web therebetween.

20. The buckle tongue assembly of claim 19, further comprising an overmold fixedly carried on the plate proximate the web aperture, wherein the overmold includes the first web gripping surface.

21. The buckle tongue assembly of claim 19, further comprising:
an overmold fixedly carried on the plate proximate the web aperture, wherein the overmold includes the first web gripping surface proximate a forward edge portion thereof;
wherein the cross-bar includes the second web gripping surface proximate an aft edge portion thereof; and
wherein the draw-bar includes the web guide surface proximate a forward edge portion thereof.

22. The buckle tongue assembly of claim 19 wherein tension in the web causes the slider to translate toward the first web gripping surface.

23. The buckle tongue assembly of claim 19 wherein the cross-bar is disposed on a first side of the plate and the draw-bar is disposed on a second side of the plate, opposite the first side.

24. The buckle tongue assembly of claim 19 wherein the first and second web gripping surfaces have complimentary shapes.

25. The buckle tongue assembly of claim 19 wherein the first web gripping surface further includes a recess, and wherein tension in the web pulls the second projection over the first projection and into the recess to clamp the web therebetween.

26. A buckle tongue assembly for use with a personal restraint system in a vehicle, the tongue assembly comprising:
a plate having a web aperture and a tongue portion, wherein the tongue portion is configured to cooperatively engage a corresponding buckle assembly, and wherein the plate includes a first edge portion positioned toward a first side of the web aperture and a second edge portion positioned toward a second side of the web aperture opposite the first edge portion;
a first web gripping surface attached to the plate proximate the web aperture;
a slider movably coupled to the plate, wherein the slider includes a first channel that slidably receives the first edge portion and a second channel that slidably receives the second edge portion, the slider having a cross-bar spaced apart from a draw-bar to define a web passage therebetween, wherein the cross-bar includes a second web gripping surface and the draw-bar includes a web guide surface, and wherein tension in a web passing through the web passage and around the guide surface pulls the second web gripping surface into an overlapping relationship with the first web gripping surface to clamp the web therebetween.

27. The buckle tongue assembly of claim 26 wherein the slider includes a first sidewall extending between first end portions of the cross-bar and the draw-bar, wherein the slider further includes a second sidewall extending between second end portions of the cross-bar and the draw-bar, wherein the first sidewall includes the first channel that slidably receives the first edge portion of the plate, and wherein the second sidewall includes the second channel that slidably receives the second edge portion of the plate.

28. The buckle tongue assembly of claim 26 wherein the first and second web gripping surfaces have complimentary shapes that interlock when the tension in the web pulls the second web gripping surface into an overlapping relationship with the first web gripping surface.

29. The buckle tongue assembly of claim 26 wherein the first web gripping surface includes a first projection extending in a first direction, wherein the second web gripping surface includes a second projection extending in a second direction, generally opposite to the first projection, and wherein tension in the web pulls the second projection over the first projection to interlock the second web gripping surface with the first web gripping surface.

30. The buckle tongue assembly of claim 29 wherein at least one of the first and second projections has a curved shape.

* * * * *

UNITED STATES PATENT AND TRADEMARK OFFICE
CERTIFICATE OF CORRECTION

| | | |
|---|---|---|
| PATENT NO. | : 9,022,483 B2 | Page 1 of 1 |
| APPLICATION NO. | : 13/490892 | |
| DATED | : May 5, 2015 | |
| INVENTOR(S) | : David D. Merrick | |

It is certified that error appears in the above-identified patent and that said Letters Patent is hereby corrected as shown below:

On the Title Page, Item (56)

On page 6, in column 2, under "Other Publications", line 28, delete "Retreived" and insert -- Retrieved --, therefor.

On page 6, in column 2, under "Other Publications", line 33, delete "ISOFIX" and insert -- ISOFIX, --, therefor.

On page 6, in column 2, under "Other Publications", line 51, delete "60/395,099," and insert -- 60/394,099, --, therefor.

In the Specification

In column 6, line 43, after "logical," and insert -- or --, therefor.

In the Claims

In column 8, lines 4-6, in claim 4, after "claim 1" delete "wherein movement of the second web gripping includes a second projection , and".

Signed and Sealed this
Third Day of November, 2015

Michelle K. Lee
*Director of the United States Patent and Trademark Office*